US012651129B1

(12) United States Patent
Ye et al.

(10) Patent No.: US 12,651,129 B1
(45) Date of Patent: Jun. 9, 2026

(54) SYSTEM FOR LANGUAGE-AWARE ACTIVE LEARNING IN MACHINE LEARNING

(71) Applicant: AMAZON TECHNOLOGIES, INC., Seattle, WA (US)

(72) Inventors: Ze Ye, Seattle, WA (US); Dantong Liu, Palo Alto, CA (US); Sri Kaushik Pavani, Redmond, WA (US); Sunny Dasgupta, Redmond, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 280 days.

(21) Appl. No.: 18/448,339

(22) Filed: Aug. 11, 2023

(51) Int. Cl.
       *G06F 40/40*          (2020.01)
(52) U.S. Cl.
       CPC .................................... *G06F 40/40* (2020.01)
(58) Field of Classification Search
       None
       See application file for complete search history.

(56) References Cited

U.S. PATENT DOCUMENTS

2022/0366143 A1 *  11/2022  Zhang .................. G06N 3/0895
2023/0177281 A1 *   6/2023  Kamath .................... G06N 3/08
                                                                        704/2
2023/0419037 A1 *  12/2023  Chen ...................... G06F 18/214
2024/0185838 A1 *   6/2024  Li ............................ G06F 40/44

OTHER PUBLICATIONS

Moniz et al. "On Efficiently Acquiring Annotations for Multilingual Models" Carnegie Mellon University Apr. 3, 2022 (Year: 2022).*

Bergmanis, et al., "Training Data Augmentation for Low-Resource Morphological Inflection", Aug. 3-4, 2017, 9 pgs. Retrieved from the Internet: URL: https://aclanthology.org/K17-2002.pdf.

Chaudhary, et al., "A Little Annotation does a Lot of Good: A Study in Bootstrapping Low-resource Named Entity Recognizers", Nov. 3-7, 2019, 11 pgs. Retrieved from the Internet: URL: https://aclanthology.org/D19-1520/.

Conneau, et al., "Unsupervised Cross-lingual Representation Learning at Scale", Facebook AI, 58th Annual Meeting of the Association for Computational Linguistics, Jul. 5-10, 2020, 12 pgs. Retrieved from the Internet: URL: https://arxiv.org/abs/1911.02116.

(Continued)

*Primary Examiner* — Pierre Louis Desir
(74) *Attorney, Agent, or Firm* — Lindauer Law, PLLC

(57)                    ABSTRACT

A multi-language classifier (MLC) provides a single model that is able to classify inputs provided in different languages. The MLC is trained using training data comprising language data in several languages. A language-aware active learning system determines subsequent training data based on uncertainty and accuracy of classification output resulting from previous iterations. Samples associated with languages that are more uncertain and have lower accuracy are prioritized for use during subsequent training iterations. This prioritization allows training to be completed with fewer samples, particularly samples that are expensive to obtain such as those labeled by human operators. As a result, the MLC is more quickly and less expensively trained to reach desired accuracy targets.

20 Claims, 6 Drawing Sheets

(56) References Cited

OTHER PUBLICATIONS

Devlin, et al., "BERT: Pre-training of Deep Bidirectional Transformers for Language Understanding", Google AI Language, NAACL-HLT 2019, Jun. 2-7, 2019, 16 pgs. Retrieved from the Internet: URL: https://arxiv.org/abs/1810.04805.

Dong, et al., "Unified Language Model Pre-training for Natural Language Understanding and Generation", Microsoft Research, Oct. 15, 2019, 14 pgs. Retrieved from the Internet: URL: https://arxiv.org/abs/1905.03197.

Fadaee, et al., "Data Augmentation for Low-Resource Neural Machine Translation", May 1, 2017, 7 pgs. Retrieved from the Internet: URL: https://arxiv.org/pdf/1705.00440.pdf.

Gal, et al., "Deep Bayesian Active Learning with Image Data", Mar. 8, 2017, 10 pgs. Retrieved from the Internet: URL: https://arxiv.org/abs/1703.02910.

Hu, et al., "XTREME: A Massively Multilingual Multi-task Benchmark for Evaluating Cross-lingual Generalization", 2003, 11 pgs. Retrieved from the Internet: URL: http://proceedings.mlr.press/v119/hu20b/hu20b.pdf.

Khare, et al., "Low Resource ASR: The surprising effectiveness of High Resource Transliteration", Aug. 30-Sep. 3, 2021, 5 pgs. Retrieved from the Internet: URL: https://www.isca-speech.org/archive/pdfs/interspeech_2021/khare21_interspeech.pdf.

Lauscher, et al., "From Zero to Hero: On the Limitations of Zero-Shot Language Transfer with Multilingual Transformers", 2020 Conference on Empirical Methods in Natural Language Processing, Nov. 16-20, 2020, 17 pgs. Retrieved from the Internet: URL: https://aclanthology.org/2020.emnlp-main.363/.

Lewis, et al., "A Sequential Algorithm for Training Text Classifers", AT&T Bell Laboratories, Jul. 24, 1994, 10 pgs. Retrieved from the Internet: URL: https://arxiv.org/pdf/cmp-lg/9407020.pdf.

Lin, et al., "Active Learning for Visual Question Answering: An Empirical Study", Nov. 6, 2017, 23 pgs. Retrieved from the Internet: URL: https://arxiv.org/abs/1711.01732.

Moniz, et al., "On Efficiently Acquiring Annotations for Multilingual Models", May 22-27, 2022, 17 pgs. Retrieved from the Internet: URL: https://aclanthology.org/2022.acl-short.9/.

Prettenhofer, et al., "Cross-Language Text Classification using Structural Correspondence Learning", Bauhaus-University Weimar, 10 pgs. Retrieved from the Internet: URL: https://aclanthology.org/P10-1114/.

Qian, et al., "Bilingual Active Learning for Relation Classification via Pseudo Parallel Corpora", Jun. 23-25, 2014, 11 pgs. Retrieved from the Internet: URL: https://aclanthology.org/P14-1055.pdf.

Raffel, et al., "Exploring the Limits of Transfer Learning with a Unified Text-to-Text Transformer", Google, Jun. 20, 2020, 67 pgs. Retrieved from the Internet: URL: https://www.jmlr.org/papers/volume21/20-074/20-074.pdf.

Sahin, et al., "Data Augmentation via Dependency Tree Morphing for Low-Resource Languages", Oct. 31-Nov. 4, 2018May 2, 2018, 6 pgs. Retrieved from the Internet: URL: https://aclanthology.org/D18-1545/.

Schwenk, et al., "A Corpus for Multilingual Document Classification in Eight Languages", Facebook AI Research, Facebook AML, 4 pgs. Retrieved from the Internet: URL: https://arxiv.org/abs/1805.09821.

Settles, Burr, "Active Learning Literature Survey", University of Wisconsin-Madison, Jan. 26, 2010, 67 pgs. Retrieved from the Internet: URL: https://burrsettles.com/pub/settles.activelearning.pdf.

Shen, et al., "Deep Active Learning for Named Entity Recognition", Feb. 4, 2018, 15 pgs. Retrieved from the Internet: URL: https://arxiv.org/abs/1707.05928.

Tonneau, et al., "Multilingual Detection of Personal Employment Status on Twitter", May 2022, 24 pgs. Retrieved from the Internet: URL: https://aclanthology.org/2022.acl-long.453/.

* cited by examiner

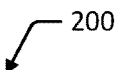

TRAINING DATA 202

| SAMPLE 208(1) | SAMPLE 208(2) | SAMPLE 208(S) |
|---|---|---|
| SAMPLE IDENTIFIER 210(1)<br>{sampleID:349481} | SAMPLE IDENTIFIER 210(2)<br>{sampleID:349482} | 210(S) |
| CLASS LABEL 212(1)<br>{sampleID:pen} | CLASS LABEL 212(2)<br>{sampleID:pen} | 212(S) |
| LANGUAGE LABEL 214(1)<br>{language:en} | LANGUAGE LABEL 214(2)<br>{language:es} | 214(S) |
| LANGUAGE DATA 216(1)<br><br>"This Hongdian ballpoint pen is equipped with a unique and streamlined stainless steel fine point to offer an unparalleled writing experience"} | LANGUAGE DATA 216(2)<br><br>"Este bolígrafo hongdiano está equipado con una punta fina de acero inoxidable única y aerodinámica para ofrecer una experiencia de escritura incomparable" | 216(S) |
| ... | ... | ... |

Figure 3:
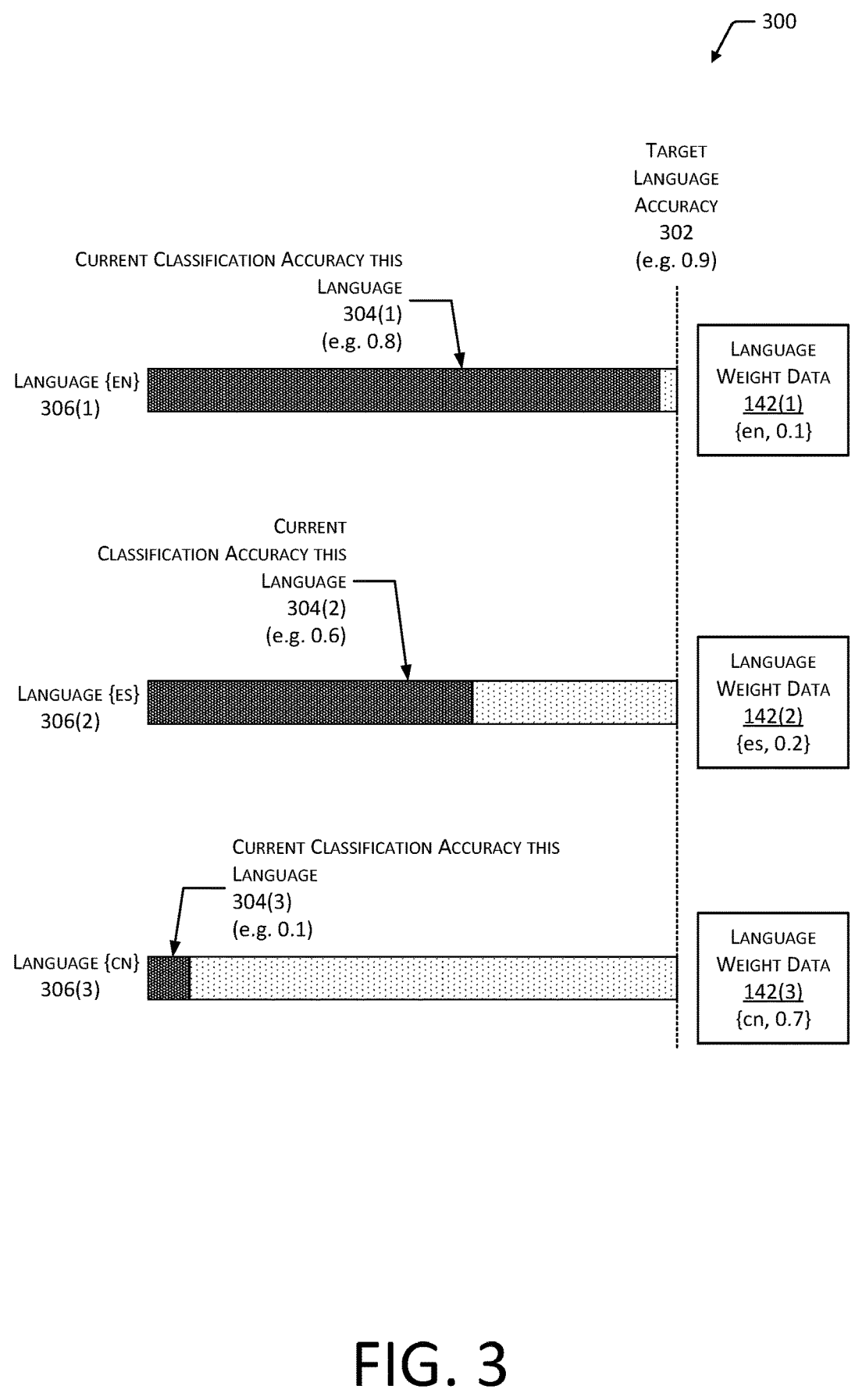

TARGET
LANGUAGE
ACCURACY
302
(e.g. 0.9)

CURRENT CLASSIFICATION ACCURACY THIS
LANGUAGE
304(1)
(e.g. 0.8)

LANGUAGE {EN}
306(1)

LANGUAGE
WEIGHT DATA
142(1)
{en, 0.1}

CURRENT
CLASSIFICATION ACCURACY THIS
LANGUAGE
304(2)
(e.g. 0.6)

LANGUAGE {ES}
306(2)

LANGUAGE
WEIGHT DATA
142(2)
{es, 0.2}

CURRENT CLASSIFICATION ACCURACY THIS
LANGUAGE
304(3)
(e.g. 0.1)

LANGUAGE {CN}
306(3)

LANGUAGE
WEIGHT DATA
142(3)
{cn, 0.7}

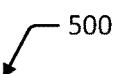

500

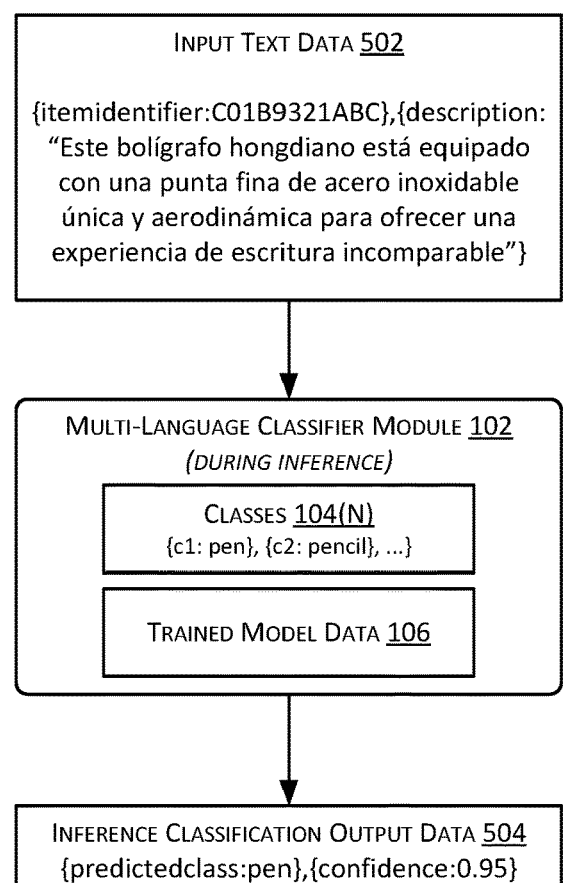

INPUT TEXT DATA 502

{itemidentifier:C01B9321ABC},{description: "Este bolígrafo hongdiano está equipado con una punta fina de acero inoxidable única y aerodinámica para ofrecer una experiencia de escritura incomparable"}

MULTI-LANGUAGE CLASSIFIER MODULE 102
*(DURING INFERENCE)*

CLASSES 104(N)
{c1: pen}, {c2: pencil}, ...}

TRAINED MODEL DATA 106

INFERENCE CLASSIFICATION OUTPUT DATA 504
{predictedclass:pen},{confidence:0.95}

FIG. 5

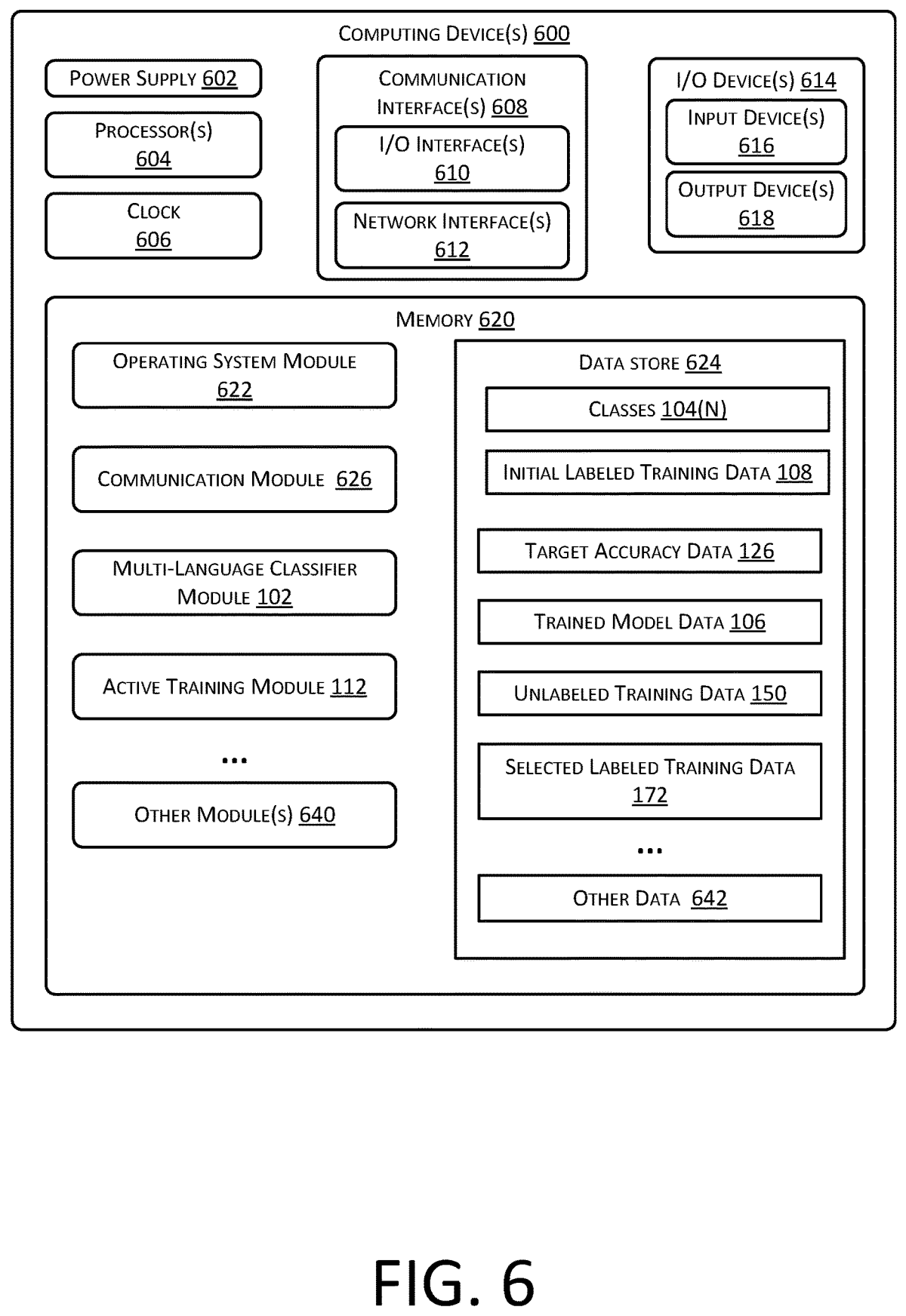

COMPUTING DEVICE(S) 600

POWER SUPPLY 602

PROCESSOR(S)
604

CLOCK
606

COMMUNICATION
INTERFACE(S) 608

I/O INTERFACE(S)
610

NETWORK INTERFACE(S)
612

I/O DEVICE(S) 614

INPUT DEVICE(S)
616

OUTPUT DEVICE(S)
618

MEMORY 620

OPERATING SYSTEM MODULE
622

COMMUNICATION MODULE 626

MULTI-LANGUAGE CLASSIFIER
MODULE 102

ACTIVE TRAINING MODULE 112

...

OTHER MODULE(S) 640

DATA STORE 624

CLASSES 104(N)

INITIAL LABELED TRAINING DATA 108

TARGET ACCURACY DATA 126

TRAINED MODEL DATA 106

UNLABELED TRAINING DATA 150

SELECTED LABELED TRAINING DATA
172

...

OTHER DATA 642

FIG. 6

SYSTEM FOR LANGUAGE-AWARE ACTIVE LEARNING IN MACHINE LEARNING

BACKGROUND

Multi-language classifiers are used to process a wide variety of data in many different applications.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features. The figures are not necessarily drawn to scale, and in some figures, the proportions or other aspects may be exaggerated to facilitate comprehension of particular aspects.

FIG. 2 illustrates training data, according to one implementation.

FIG. 3 illustrates a graph of languages and their associated current classification accuracies and target classification accuracies in one implementation.

FIG. 4 illustrates different iterations of training data determined using language-aware active learning, according to some implementations.

FIG. 5 illustrates a flow diagram of a trained multi-language classifier operating during inference, according to some implementations.

FIG. 6 is a block diagram of a computing device to implement the system, according to some implementations.

Figure 1:
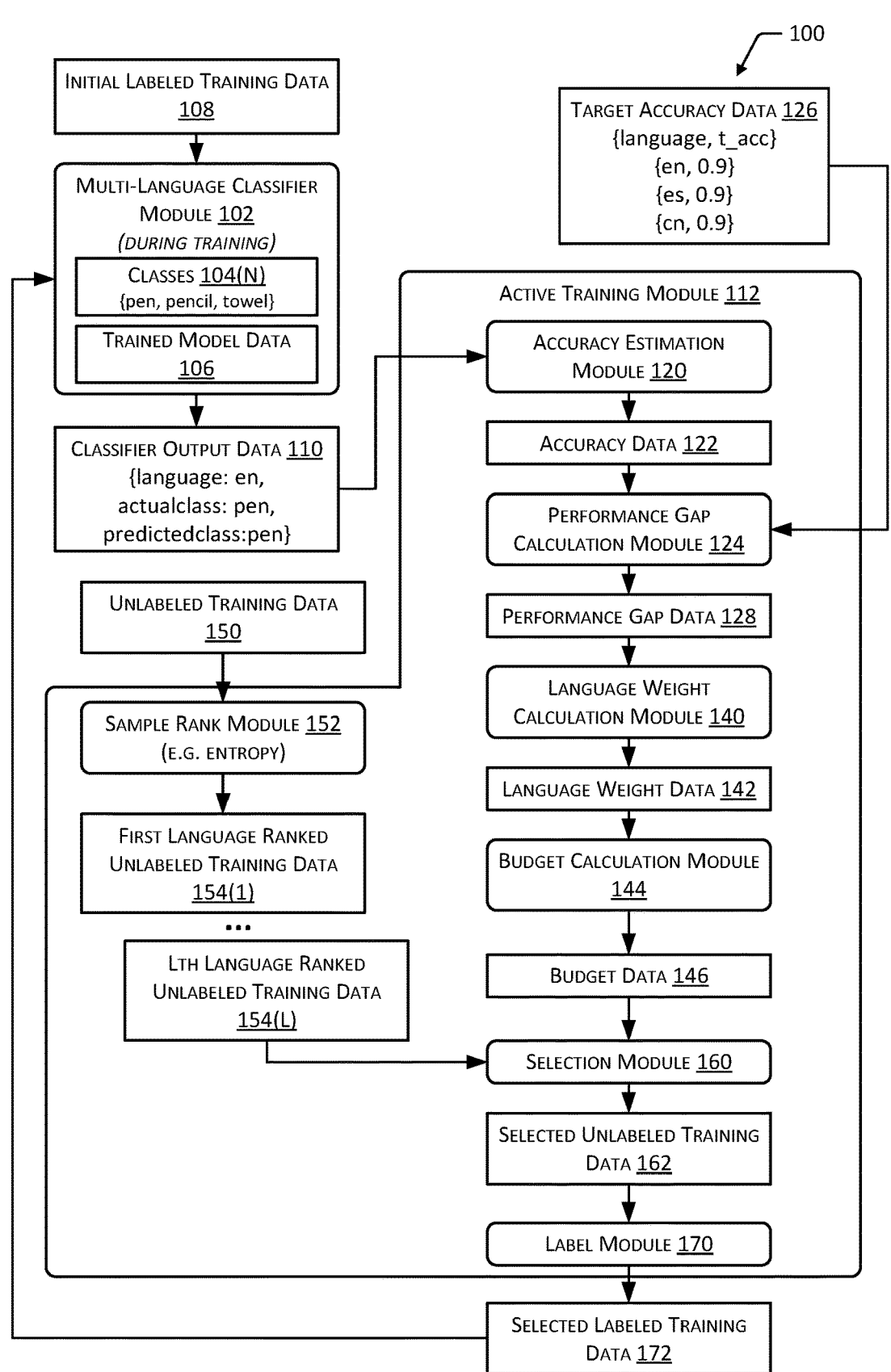
FIG. 1 illustrates a system for language-aware active learning for use by a multi-language classifier, according to some implementations.

While implementations are described herein by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

Machine learning systems such as multi-language classifiers (MLCs) are used in a wide variety of applications. During operation, an MLC processes input that may be in one or more languages and provides as output information such as a class or set of classes. For example, an MLC may be trained to process input data such as text in one of a plurality of languages and determine if the text describes one of three classes of objects: "pen", "pencil", or "towel". Once trained, if the MLC is provided with input text in any of the plurality of languages, it may provide a classifier output that indicates one or more classes. In some implementations the classifier output may include a classifier score that indicates a likelihood that the class is correct. Continuing the example, if the input text is Spanish text describing a pen, a properly trained and functioning MLC may provide as output a class and a confidence value "{pen, 0.9}, {pencil, 0.1}, {towel, 0.0}" indicating that there is a high likelihood that the input text describes a pen, a low likelihood that the input text describes a pencil, and no likelihood that the input text describes a towel.

Various technical approaches may be used to implement an MLC. For example, MLCs may implement various kinds of neural networks, Bayesian classifiers, support vector machines, and so forth. Many MLCs are prepared for operation by performing one or more training operations. These training operations may include many iterations of processing labeled data with the MLC.

Labeled data may comprise many samples comprising language data such as a text description in a language, a language label indicating the language the text description is in, and a class label. In some implementations, the labeled data may be created at least in part by a human operator. Continuing the earlier example, the labeled data may include a sample comprising language data comprising text in Spanish describing a pen, an associated language label indicating "Spanish", and a class label indicating "pen" that has been assigned by a human operator. Typically, the larger the set of labeled data to use for training, the more accurate the MLC will be during operation. To attain desired levels of accuracy of an MLC, labeled data may include thousands or even millions of samples. However, labeled data is expensive in time and cost to create.

During iterations of training the MLC, a sample of labeled data is provided as input, and the resulting classifier output is compared to the corresponding label in the labeled data. In some implementations, with each training iteration, modifications to internal values of the MLC are made to represent feedback between what the MLC determined the class to be and the class as indicated by the label of the instance. For example, the labeled data for an iteration is language data comprising text describing a pen in Spanish having an annotation label of "pen". Continuing the example, the output from that iteration may be a class of "pencil". The output of "pencil" is compared to the known annotation label of "pen" and is used to provide feedback to the MLC. By iterating many times, eventually the MLC may be trained to reach a level of accuracy for a given input language that is deemed to be sufficient for use.

Once trained, the MLC may be used in a production setting to process query inputs in any of the languages that were used during training, and determine classifications associated with that query input. In some situations, learning may be ongoing. For example, additional training may be performed over time to further improve or maintain accuracy of the MLC.

Traditionally various approaches have been tried to select the samples used to train MLCs. These include random selection or various heuristics such as entropy analysis, expected loss reduction, and so forth. However, these systems have several drawbacks. In particular, they may continue to select samples for which the MLC is already sufficiently trained. This results in a substantial waste of resources. For example, consider a classifier that is processing input in English, Spanish, and Chinese, with a set of language data that is predominately obtained from users in the United States. The set of language data will be predominately English, with some Spanish, and relatively few entries in Chinese. Using traditional approaches, English samples may be sent for costly labeling and the resulting labeled data is used to perform additional training iterations that do not provide a useful improvement in accuracy for input in Spanish or Chinese because samples in these languages are not well represented.

Described in this disclosure are systems and techniques for language-aware training of a machine learning system such as an MLC. The MLC processes a first set of labeled sample data and produces classifier output. These samples and their associated classifier output are assessed to determine their accuracy. Based on the accuracy, a performance gap is determined that indicates a variance between a target accuracy for a specified language and the accuracy observed during the previous iteration. Based on the performance gap, language weights are calculated that indicate the relative weight to be given in selecting samples associated with a particular language. For example, a large performance gap for a particular language such as Chinese would result in a relatively large language weight being associated with Chinese. The language weights are then used to determine budget data that allocates, for a next training iteration, how many samples will be allocated to each of the languages. For example, the budget data may indicate two-hundred and fifty Spanish samples, six-hundred and eighty Chinese samples, and seventy English samples in the next batch of one-thousand samples.

A pool of unlabeled training data comprising samples that do not have class label data available is then processed to determine sets of ranked unlabeled training data. In one implementation unlabeled samples may be ranked based on the entropy of their language data, with highest entropy ranked first. Samples of each language being processed may be ranked separately. For example, samples in the unlabeled training data may be sorted by language label, and then ranked within each language by entropy.

The budget data may then be used to select the specified number of samples from the respective ranks of unlabeled samples. Continuing the example, the top ranked two-hundred and fifty Spanish samples are selected, the top ranked six-hundred and eighty Chinese samples are selected, and the top ranked seventy English samples are selected. The selected unlabeled samples may then be sent for processing, where a human operator or other system determines the associated class label. This set of selected labeled training data may now be used for the next training iteration of the MLC. The process may continue until the target accuracies for the languages have been achieved.

The languages used to train the MLC may include natural languages, formal languages, and so forth. For example, natural languages may include human languages such as English, Spanish, Chinese, Hindi, and so forth. Formal languages may include mathematical or logical languages that are based on specified symbols and specified rules associated with combinations of those symbols.

By using the techniques and systems described herein, a machine learning system such as an MLC is able to be quickly and efficiently trained. Compared to naïve methods of labelling data, substantial reductions are realized in the number of samples processed and corresponding reductions in the time and cost to determine the labels. Consumption of compute resources during training are also reduced as the overall size of the labeled data used may be less than that associated with traditional techniques.

Illustrative System

FIG. 1 illustrates a system 100 for language-aware active learning for use by a multi-language classifier, according to some implementations. A multi-language classifier (MLC) module 102 is shown.

The MLC module 102 is trained to provide, responsive to input in one of a plurality of languages, output indicative of one or more classes 104(1), 104(2), . . . , 104(N) that are deemed to be associated with the input. For example, an MLC module 102 may be trained to determine if the input is associated with a pen, pencil, or towel. In this example, there are three classes 104: a first class 104(1) {pen}, a second class 104(2) {pencil}, and third class 104(3) {towel}.

The MLC module 102 may utilize one or more neural networks, Bayesian classifiers, support vector machines, and so forth. The training process determines trained model data 106. For example, the trained model data 106 may comprise one or more of neural network node weights, bias values, and so forth. The trained model data 106 is determined by iterations of processing training data. In the implementation depicted here, iterations of processing labeled training data. During each iteration, a sample is processed and feedback may be determined that is based on a variance between the classifier output and the previously determined class label, such as provided by a human operator.

In the implementation depicted here, initial labeled training data 108 is provided as input to the MLC module 102 during a first iteration of training. The initial labeled training data 108 comprises samples with associated language labels and class labels. During subsequent training iterations, selected labeled training data 172 (described below) may be provided as input.

After processing the input, the MLC module 102 provides classifier output data 110. For example, the classifier output data 110 may indicate, given the input language data comprising text, classifier scores indicative of a likelihood that the language data belongs to that class. Continuing the example, the classifier output data 110 may indicate classifier scores of {0.5, 0.4, 0.1} indicating that there is a 50% chance that the input text belongs to the first class 104(1) {pen}, a 40% chance that the input text belongs to the second class 104(2) {pencil}, and a 10% chance that the input text belongs to the third class 104(3) {towel}.

The accuracy of the output from the MLC module 102 is indicative of the ability of the MLC module 102 to distinguish between different classes 104 given inputs in particular languages. The accuracy may be specified in terms of one or more of percentage of correct classifications relative to all, recall, precision, classification accuracy, false positive rate, and so forth.

As mentioned above, the MLC module 102 is trained using labeled data. The labeled data comprises samples of language data and associated class labels and language labels. The initial labeled training data 108 may be used to perform an initial training iteration. Once the initial training iteration is complete, further active training may be performed to improve the performance of the MLC module 102.

Creation of labeled data is time consuming and expensive. For example, labeled data may be created by presenting samples of language data to a user who then assigns an annotation label, such as "pen", "pencil", or "towel" in the example above. In general, the larger the set of labeled data, the more training iterations of the MLC module 102 may be performed. Additional training with labeled data may also improve accuracy of the classification determinations made by the MLC module 102.

In a traditional system, various approaches have been attempted to select which samples of language data should be used to create labeled data. However, these approaches fail to provide a substantial improvement in performance, and may still result in unnecessary waste of resources to create unnecessary labeled data and perform training using that unnecessary labeled data.

A language-aware active training module 112 accepts as input classifier output data 110 and information associated with the input to the MLC module 102. For example, the active training module 112 may accept as input information such as the language label and class label provide in the labeled input, and the predicted class determined by the MLC module 102. The modules described with respect to the active training module 112 are provided by way of illustration, and not necessarily as a limitation. In some implementations, one or more functions, calculations, or operations may be consolidated into a single module, or otherwise distributed.

An accuracy estimation module 120 determines, based on the classifier output data 110, accuracy data 122 indicative of an accuracy of the predicted class for a specified language. In one implementation, the accuracy data 122 may be calculated using a k-fold technique. For example, 80% of the labeled samples available for input in a batch may be used for training and the remaining 20% of the labeled samples used for testing. The accuracy may then be determined based on the portion of labeled samples used for testing. In other implementations, other techniques may be used to estimate the accuracy.

A performance gap calculation module 124 accepts as input the accuracy data 122 and target accuracy data 126, and determines as output performance gap data 128. The performance gap data 128 is indicative of a variance, for a specified language, between a target accuracy and the observed accuracy indicated by the accuracy data 122. The target accuracy data 126 may be previously specified. For example, the target accuracy data 126 may specify a desired accuracy in predicting the classes for a particular language.

A language weight calculation module 140 accepts as input the performance gap data 128 and determines as output language weight data 142. The language weight data 142 indicates respective weight values associated with respective ones of the languages processed by the MLC module 102. These weight values are indicative of a priority to be accorded to samples associated with the respective language. For example, language weight data 142 that indicates {cn: 0.7} and {en: 0.1} indicates that Chinese language samples will be weighted more heavily over English language samples. This situation may occur when the accuracy of the predicted classes for samples having language data in Chinese is far below the target accuracy for Chinese, while samples having language data in English are relatively close to the target accuracy for English.

A budget calculation module 144 accepts as input the language weight data 142 and determines as output budget data 146. The budget data 146 may be indicative of a how samples will be allocated across the next batch of unlabeled training data for determination of selected labeled training data 172. In one implementation, the budget data 146 may be indicative of a number of samples of respective ones of the languages associated with operation of the MLC module 102. For example, the budget data 146 may specify two-hundred and fifty Spanish samples, six-hundred and eighty Chinese samples, and seventy English samples in the next batch of one-thousand samples.

Unlabeled training data 150 comprises samples for which class label data is unavailable. Other label information may be available. For example, the unlabeled training data 150 may comprise samples comprising language data, language labels, but have null values for the class labels. As described previously, to facilitate further training, the class labels would need to be determined and provided.

A sample rank module 152 accepts as input the unlabeled training data 150 and determines sets of language ranked unlabeled training data 154 for the languages associated with operation of the MLC module 102. For example, first language ranked unlabeled training data 154(1) may comprise ranked samples associated with English, second language ranked unlabeled training data 154(2) may comprise ranked samples associated with Spanish, and so forth for the Lth language ranked unlabeled training data 154(L).

The sample rank module 152 may determine one or more characteristics of the samples in the unlabeled training data 150 and order the samples by language and the respective values of those one or more characteristics. In one implementation the sample rank module 152 may determine an entropy value associated with the language data. Samples in the unlabeled training data 150 may then be ranked, for each language, by their entropy values, with greatest entropy values ranked first.

In another implementation, the sample rank module 152 may determine one or more characteristics of the samples in the unlabeled training data 150, such as the entropy and the respective weight value of the language weight data 142. The samples of the unlabeled training data 150 may be ranked based on a combination or product of these one or more characteristics. For example, a given sample may be ranked based on a product of the entropy value and the respective weight value. The selection module 160 may then select a top k number of samples to determine the selected unlabeled training data 162.

In some implementations each language may be ranked separately. The selection module 160, as described below, may then select samples from each of the separately ranked languages.

In other implementations, other techniques may be used to rank the samples for a respective language. For example, samples may be ranked by length of the language data, count of keywords in the language data, frequency of words within the language data, and so forth.

A selection module 160 accepts as input the budget data 146 and the language ranked unlabeled training data 154 (1)-(L) and determines as output selected unlabeled training data 162. In one implementation, the selection module 160 may select, given the number of samples specified for each language in the budget data 146, that number of samples from the respective language ranked unlabeled training data 154. Continuing the earlier example, the selection module 160 may select the top seventy English samples from the first language ranked unlabeled training data 154(1) associated with English, the top two-hundred and fifty Spanish samples from the second language ranked unlabeled training data 154(2) associated with Spanish, the top six hundred and eighty Chinese samples from the third language ranked unlabeled training data 154(3) associated with Chinese, and so forth.

In another implementation, the selection module 160 may use other techniques to determine the samples from the respective languages. For example, each of the independently ranked languages may be sampled based on the language weight data 142.

The selected unlabeled training data 162 is then provided to a label module 170. The label module 170 may comprise one or more machine learning systems, human operators, and so forth. The label module 170 may process the selected unlabeled training data 162 to determine the selected labeled training data 172. In some implementations, the data may be processed based on the ranked order determined by the sample rank module 152. The selected labeled training data 172 may comprise the samples of language data specified by the selected unlabeled training data 162 and values of label data appended by the label module 170 to the samples. The samples and their class labels and language labels are then provided to the MLC module 102. The MLC module 102 may then be trained using the selected labeled training data 172.

The operation of the active training module 112 may be considered a multi-objective optimization problem. The goal is to select unlabeled data samples that are both (1) uncertain (i.e., the MLC module 102 is not confident in its predictions), and (2) from languages for which the MLC module 102 achieves lower accuracy than the target accuracy. Specifically, optimization may include selecting an unlabeled data sample $x_j$ (j denotes the index of the data point in unlabeled training data 150) is selected for labeling with two measures:(1) uncertainty in prediction scores $H_j$, and (2) a language-specific weighting parameter $L_{j'}$ (j' denotes the language that data point j belongs to, $j' \in J'$, where J' is the set of languages contained in unlabeled training data 150 and we assume the language of each sample is known). In one active learning iteration, a batch $\hat{B}$ is selected of unlabeled data with B elements as stated in Equation 1:

$$\hat{B} = \underset{S' \subset S, |S'| = B}{\text{argmax}} \sum_{s \in S'} s_j \qquad \text{EQUATION 1}$$

Here S is a list of scores determining if a sample of unlabeled data is to be selected. The score $s_j \in S$ is a function of the uncertainty score $H_j$ and the language weight $L_j$, $s_j = J(H_j, L_{j'}).J(.)$ can be altered for different use cases, as long as $J(\cdot)$ has positive correlation with $H_j$ and $L_{j'}.$ |S'| denotes the number of elements in the subset S'. Overall, the mathematical expression in Equation 1 denotes a subset of elements $\hat{B}$ with size B that have the highest sum of the function $J(.)$.

In one implementation, $H_j$ is the entropy of classification probability scores calculated as $$H(s) = -\sum_{i=1}^{k} p_i \log p_i,$$

where k is the number of possible labels in a multi-class classifier, $p_i$ is the probability that the classifier assigns to label i, and log is the binary logarithm, log base 2. A higher entropy indicates that the classifier is more uncertain, while a lower entropy indicates that the classifier is more certain. The language weight $L_{j'}$ is decided based on the performance gap between the currently achieved accuracy of each language and its accuracy target. The higher gap results in higher language weight. In one implementation, the overall annotation budget (B) in each active learning iteration may be divided among different languages based on their language weight $L_{j'}.$ Within each language's budget, we select the samples with high entropy $H_j$ from that language. In other implementations, characteristics other than or in addition to entropy may be used to rank the samples.

The active training module 112 may implement the following algorithm to determine the selected labeled training data 172.

Inputs: Unlabeled data pool $\mathcal{D}_{pool}$, batch size B, initial seed set $\mathcal{D}_{seed}$, query strategy $Q$, training data $S$, target accuracy of each language $$\mathcal{A}_{j'}^{tgt}$$

(j'∈J', and J' is the set of languages contained in unlabeled data).

$$S \leftarrow \mathcal{D}_{seed}$$

while stopping criteria is not met do
    if AWS translate is enabled then
      translate S to all the languages of interest $\mathcal{T}$
    $S \leftarrow S + \mathcal{T}$ $$MS\mathcal{A}_{j'}^{est}$$

Train the model using.

$$MS\mathcal{A}_{j'}^{est}$$

Estimate achieved accuracy of each language.
  Calculate the performance gap of each language $$g_{j'} = \max(\mathcal{A}_{j'}^{tgt} - \mathcal{A}_{j'}^{est}, 0).$$

Calculate the language weight $\mathcal{L}_j = g_j / \Sigma_{j' \in J'} g_{j'}.$
  Calculate the annotation budget of each language $\mathcal{B}_j = B * \mathcal{L}_{j'}.$
  Rank instances from $\mathcal{D}_{pool}$ using $Q$. (e.g., rank instances based on entropy)
  Label top-ranked $\mathcal{B}_j$, instances of each language, add to $S$.
  Remove $S$ from the unlabeled data i.e. $\mathcal{D}_{pool} \leftarrow \mathcal{D}_{pool} \setminus S$.
Algorithm 1

The active training module 112 may operate in a batch-mode, as described below in Algorithm 2.

Inputs: Unlabeled data pool $\mathcal{D}_{pool}$, batch size $\mathcal{B}$, initial seed set $\mathcal{D}_{seed}$, query strategy $Q$, training data $S$.

$$S \leftarrow \mathcal{D}_{seed}$$

while stopping criteria is not met do
    if machine translate is enabled then
      translate $S$ to all the languages of interest $\mathcal{T}$
    $S \leftarrow S + \mathcal{T}$ Train the model $\mathcal{M}$ using $S$.
  Rank instances from $\mathcal{D}_{pool}$ using $Q$.
  Label top-ranked $\mathcal{B}$ data instances, add them to $S$.
  Remove $S$ from the unlabeled data i.e. $\mathcal{D}_{pool} \leftarrow \mathcal{D}_{pool} \setminus S$.
Algorithm 2

FIG. 2 illustrates at 200 training data 202, according to one implementation. The training data 202 comprises a plurality of samples 208(1), 208(2), . . . , 208(S). Each sample 208 may comprise a sample identifier 210, class label 212, language label 214, and language data 216. In some implementations a subset of this information, or additional information may be included. For example, the sample 208 may comprise an item identification that references a specific item or service that is available for sale.

The sample identifier 210 is indicative of a particular sample. For example, the sample identifier 210 may be assigned sequentially.

The class label 212 comprises data indicative of one or more classes 104 that the language data 216 is associated with.

The language label 214 comprises data indicative of one or more languages that the language data 216 is associated with. For example, the language label 214 may indicate one or more of a particular language, dialect, regional affiliation, language form, or other information.

The language data 216 may comprise one or more of text data, tokens, or other data that is expressed in one or more languages. For example, the language data 216 may comprise a textual description of an item or service that is offered for sale. In some implementations the language data 216 may be determined by a human operator. For example, a copywriter may create the textual description of the item or service. In other implementations the language data 216 may be determined by an automated system, or a human operator in conjunction with an automated system. For example, a machine learning network that has been trained to translate from a first language to a second language may be used to translate the textual description from the first language to the second language.

In some implementations samples may be provided in a plurality of languages that are associated with a single item identifier. For example, a particular item identifier for a particular pen may be associated with samples 208 having language data 216 in a plurality of the languages supported by the MLC module 102. In some implementations, the language data 216 from a first sample 208(101) in a first language may be translated and used to create a second sample 208(102) in a second language that describes the same item identifier.

FIG. 3 illustrates a graph 300 of languages and their associated current classification accuracies and target language accuracies, in one implementation. In this illustration, the MLC module 102 is trained to classify inputs in three languages 306(1)-(3): English, Spanish, and Chinese. In this illustration these languages 306 have the same target language accuracy 302, such as specified in the target accuracy data 126. In other implementations, different classes 104 may have different target language accuracy 302 values.

The accuracy data 122 indicates that the first language 306(1) English has a current classification accuracy 304(1) of 0.8. This is less than the desired target language accuracy 302 of 0.9 specified by the target accuracy data 126. The language weight data 142(1) that is associated with the first language 306(1) has been determined by the language weight calculation module 140 as 0.1.

The accuracy data 122 indicates that the second language 306(2) Spanish has a current classification accuracy 304(2) of 0.6. This is less than the desired target language accuracy 302 of 0.9 specified by the target accuracy data 126. The language weight data 142(2) that is associated with the second language 306(2) has been determined by the language weight calculation module 140 as 0.2.

The accuracy data 122 indicates that the third language 306(3) Chinese has a current classification accuracy 304(3) of 0.1. This is less than the desired target language accuracy 302 of 0.9 specified by the target accuracy data 126. The language weight data 142(3) that is associated with the third language 306(3) has been determined by the language weight calculation module 140 as 0.7.

As illustrated here, as the current classification accuracy 304 of a language increases, the language weight associated with that language decreases. For example, the first language 306(1) English has a current classification accuracy 304(1) that is close to the target language accuracy 302. In comparison, the third language 306(3) Chinese has a current classification accuracy 304(3) that is far less than the target language accuracy 302. As a result, the selected unlabeled training data 162 associated with this graph will prioritize samples 208 that contain the third language 306(3) Chinese, followed by the second language 306(2) Spanish, and may include the first language 306(1) English.

Figure 4:
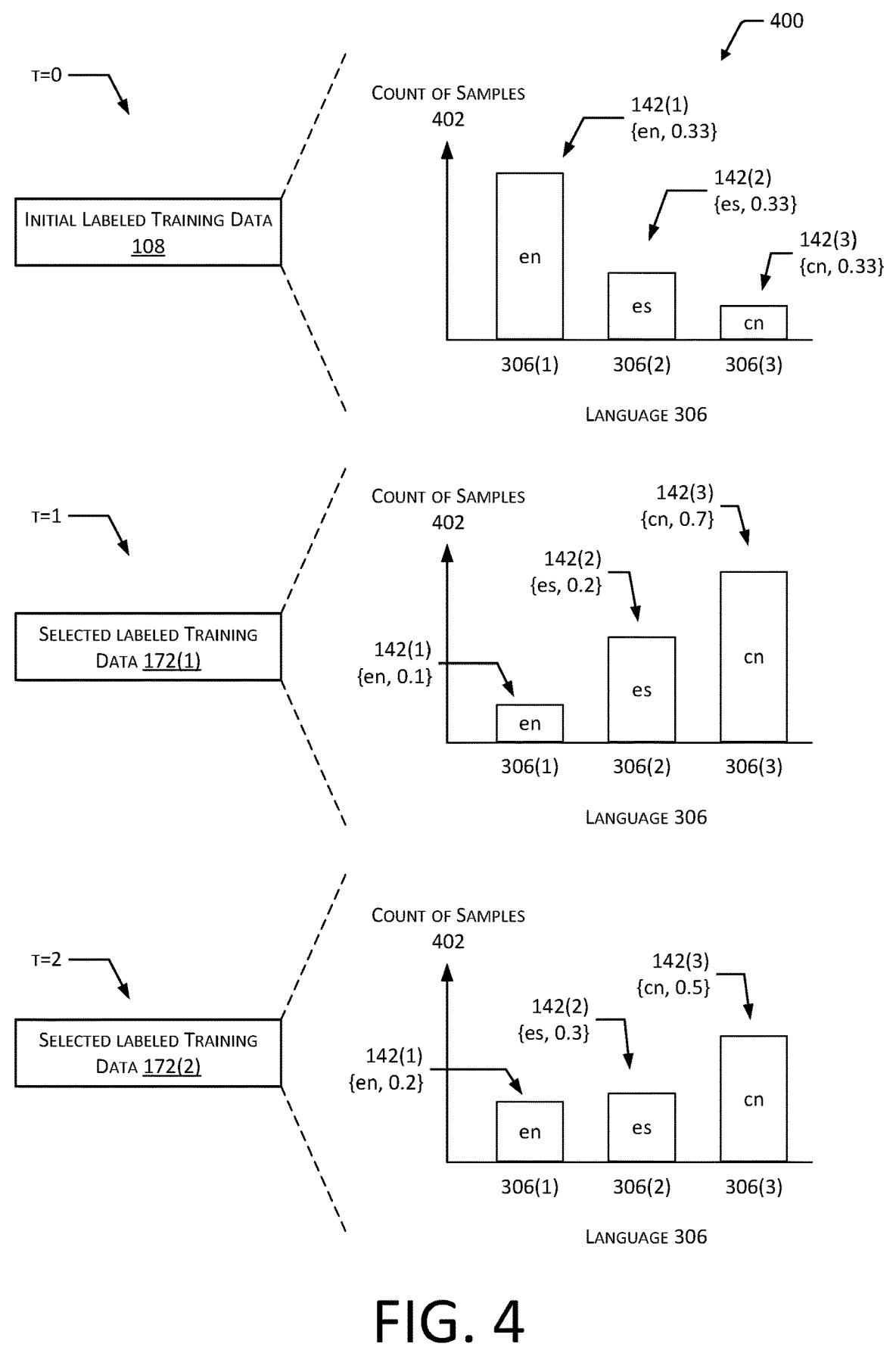

FIG. 4 illustrates at 400 different iterations of training data 202 determined using the active training module 112, according to some implementations. For each iteration a bar graph is shown, depicting three languages 306(1)-(3) and the respective count of samples 402 included in the instance of training data.

At time t=0, the initial labeled training data 108 is depicted. For example, the initial labeled training data 108 may comprise samples that have been acquired from a corpus that comprises predominately language data in English, with some entries in Spanish, and relatively few entries in Chinese. For example, the count of samples 402 associated with English 306(1) is greatest, followed by the count of samples 402 associated with Spanish 306(2), and then the lowest count of samples 402 associated with Chinese 306(3). As a result of a random sample of this corpus to determine the initial labeled training data 108, the distribution of the count of samples 402 is approximately that of the relative percentage in the corpus of entries corresponding to each language. Also shown are the language weight data 142 associated with each language. In this illustration, all three languages begin with equal values of language weight data 142.

In comparison, at time t=1 the active training module 112 has been used to determine selected unlabeled training data 162, that is then processed to determine selected labeled training data 172(1). As a result of operation of the active training module 112 and the corresponding changes in the language weight data 142 as shown, the distribution of counts of samples 402 at t=1 differs from that of t=0. As illustrated here, at t=1 the count of samples 402 associated with the Chinese 306(3) are now the largest, followed by Spanish 306(2), and English 306(1) representing the fewest count of samples 402. As a result, during subsequent training the MLC module 102 will have more samples 208 of the lowest accuracy language, in this example Chinese 306(3), to learn from in the next training iteration.

Also shown is time t=2, showing the selected labeled training data 172(2) determined by the active training module 112 after training of the MLC module 102 has proceeded using the selected labeled training data 172(1) determined at t=1. The language weight data 142 for the respective languages are shown. As shown in this illustration the MLC module 102 has improved performance with respect to Chinese 306(3) and Spanish 306(2), as a result the count of samples 402 associated with these languages has been reduced somewhat compared to t=1, while the count of samples 402 in English 306(1) have increased.

As shown, over time the active training module 112 results in a change in the count of samples 402 that are associated with particular languages 306. Those languages 306 that are exhibiting current classification accuracy 304 that is less than the target language accuracy 302 may continue to exhibit a relatively larger number of samples 208 in subsequent selected unlabeled training data 162 and selected labeled training data 172.

FIG. 5 illustrates a flow diagram 500 of a trained MLC module 102 operating during inference, according to some implementations. In this illustration, the MLC module 102 has been trained, and is operating in an inference mode.

Input text data 502 is provided as input to the MLC module 102. The input text data 502 may comprise text data in one or more languages 306 that the MLC module 102 has been previously trained to process. In some implementations, the input text data 502 may include, or be associated with, additional data. For example, the additional data may comprise an item identifier.

The languages 306 used to train the MLC module 102 and accepted as input by the MLC module 102 may include natural languages, formal languages, and so forth. For example, natural languages may include human languages such as English, Spanish, Chinese, Hindi, Portuguese, and so forth. Formal languages may include mathematical or logical languages that are based on specified symbols and specified rules associated with combinations of those symbols. The MLC module 102 is trained to accept input in one of a plurality of languages 306.

The MLC module 102 provides as output inference classification output data 504. The inference classification output data 504 may comprise one or more of classification data, confidence values, and so forth. For example, the inference classification output data 504 may indicate one or more of the classes 104. In some implementations additional data, such as a confidence value may be included in the output. The confidence value may be indicative of a likelihood that the particular class 104 is correct.

FIG. 6 is a block diagram of a computing device 600 to implement the system 100, according to some implementations. The computing device 600 may be implemented as one or more of an "embedded system", "on-demand computing", "software as a service (Saas)", "platform computing", "network-accessible platform", "cloud services", "data centers", and so forth. Services provided by the computing device 600 may be distributed across one or more physical or virtual devices.

One or more power supplies 602 may be configured to provide electrical power suitable for operating the components in the computing device 600. The one or more power supplies 602 may comprise batteries, connections to an electric utility, and so forth. The computing device 600 may include one or more hardware processors 604 (processors) configured to execute one or more stored instructions. For example, the hardware processors 604 may include application specific integrated circuits (ASICs), field-programmable gate arrays (FPGAs), digital signal processors (DSPs), hardware accelerators, graphics processing units (GPUs), and so forth. For example, the processors 604 may include hardware optimized to perform one or more functions of the MLC module 102, the language-aware active training module 112, and so forth. The processors 604 may comprise one or more cores. One or more clocks 606 may provide information indicative of date, time, ticks, and so forth.

The computing device 600 may include one or more communication interfaces 608 such as input/output (I/O) interfaces 610, network interfaces 612, and so forth. The communication interfaces 608 enable the computing device 600, or components thereof, to communicate with other devices or components. The communication interfaces 608 may include one or more I/O interfaces 610. The I/O interfaces 610 may comprise Inter-Integrated Circuit (I2C), Serial Peripheral Interface bus (SPI), Universal Serial Bus (USB) as promulgated by the USB Implementers Forum, RS-232, Peripheral Component Interconnect (PCI), serial AT attachment (SATA), and so forth.

The I/O interface(s) 610 may couple to one or more I/O devices 614. The I/O devices 614 may include input devices 616 such as one or more of a sensor, keyboard, mouse, scanner, and so forth. The I/O devices 614 may also include output devices 618 such as one or more of a display device, printer, audio speakers, and so forth. In some embodiments, the I/O devices 614 may be physically incorporated with the computing device 600 or may be externally placed.

The network interfaces 612 may be configured to provide communications between the computing device 600 and other devices, such as routers, access points, and so forth. The network interfaces 612 may include devices configured to couple to personal area networks (PANs), local area networks (LANs), wireless local area networks (WLANS), wide area networks (WANs), and so forth. For example, the network interfaces 612 may include devices compatible with Ethernet, Wi-Fi, Bluetooth, and so forth.

The computing device 600 may also include one or more buses or other internal communications hardware or software that allow for the transfer of data between the various modules and components of the computing device 600.

As shown in FIG. 6, the computing device 600 includes one or more memories 620. The memory 620 may comprise one or more non-transitory computer-readable storage media (CRSM). The CRSM may be any one or more of an electronic storage medium, a magnetic storage medium, an optical storage medium, a quantum storage medium, a mechanical computer storage medium, and so forth. The memory 620 provides storage of computer-readable instructions, data structures, program modules, and other data for the operation of the computing device 600. A few example functional modules are shown stored in the memory 620, although the same functionality may alternatively be implemented in hardware, firmware, or as a system on a chip (SoC).

The memory 620 may include at least one operating system (OS) module 622. The OS module 622 is configured to manage hardware resource devices such as the I/O interfaces 610, the I/O devices 614, the communication interfaces 608, and provide various services to applications or modules executing on the processors 604. The OS module 622 may implement a variant of the FreeBSD operating system as promulgated by the FreeBSD Project; other UNIX or UNIX-like variants; a variation of the Linux operating system as promulgated by Linus Torvalds; the Windows operating system from Microsoft Corporation of Redmond, Washington, USA; and so forth.

Also stored in the memory 620 may be a data store 624 and one or more of the following modules. For example, these modules may be executed as foreground applications, background tasks, daemons, and so forth. The data store 624 may use a flat file, database, linked list, tree, executable code, script, or other data structure to store information. In some implementations, the data store 624 or a portion of the data store 624 may be distributed across one or more other devices including other computing devices 600, network attached storage devices, and so forth.

The data store 624 may store one or more of target accuracy data 126, the classes 104, initial labeled training data 108, trained model data 106, unlabeled training data 150, selected unlabeled training data 162, selected labeled training data 172, and so forth.

A communication module 626 may be configured to establish communications with other computing devices 600 or other devices. The communications may be authenticated, encrypted, and so forth.

The memory 620 may also store the multi-language classifier module 102 and the language-aware active training module 112.

Other modules 640 may also be present in the memory 620 as well as other data 642 in the data store 624. For example, an administrative module may provide a web interface to allow operators to modify operation of the multi-language classifier module 102, language-aware active training module 112, and so forth.

The processes discussed herein may be implemented in hardware, software, or a combination thereof. In the context of software, the described operations represent computer-executable instructions stored on one or more non-transitory computer-readable storage media that, when executed by one or more processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described herein. The computer-readable storage medium may be one or more of an electronic storage medium, a magnetic storage medium, an optical storage medium, a quantum storage medium, and so forth. For example, the computer-readable storage media may include, but is not limited to, hard drives, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Thus, although certain steps have been described as being performed by certain devices, software programs, processes, or entities, this need not be the case, and a variety of alternative implementations will be understood by those having ordinary skill in the art.

Additionally, those having ordinary skill in the art will readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as illustrative forms of implementing the claims.

What is claimed is:

1. A system comprising:

a memory, storing first computer-executable instructions; and a hardware processor to execute the first computer-executable instructions to:

determine a first set of classes associated with a multi-language classifier;

determine first training data comprising:

a first plurality of samples, each sample comprising:

language data comprising information expressed in a respective language of a first plurality of languages, and a first class label that is indicative of a respective class of the first set of classes;

determine first classification output data based on processing the first training data using the multi-language classifier, wherein the first classification output data comprises a predicted class associated with a respective one of the first plurality of samples;

determine, based on the first classification output data, first accuracy data indicative of an accuracy of the first classification output data;

determine, based on the first accuracy data and target accuracy data, performance gap data indicative of a variance between the accuracy of the first classification output data and the target accuracy data for one or more of the first plurality of languages;

determine, based on the performance gap data, language weight data indicative of respective weight values associated with respective ones of the first plurality of languages;

determine, based on the language weight data, budget data indicative of a number of samples of respective ones of the first plurality of languages;

determine a first set of values, wherein each value is indicative of one or more characteristics of a sample of a first set of unlabeled training data;

determine a first set of ranked unlabeled training data, wherein each sample of the first set of ranked unlabeled training data is ordered based on a respective value of the first set of values;

determine, based on the budget data and the first set of ranked unlabeled training data, a first set of selected unlabeled training data;

determine, based on the first set of selected unlabeled training data, selected labeled training data comprising one or more samples and an associated label;

train the multi-language classifier using the selected labeled training data;

determine second classification output data;

determine, based on the second classification output data, second accuracy data indicative of an accuracy of the second classification output data;

determine that second accuracy data does not meet a target accuracy for one or more of the first plurality of languages;

reiterate training of the multi-language classifier using additional labeled training data until the target accuracy for each of the first plurality of languages is met;

determine input text data in one of the first plurality of languages; and after the target accuracy has been met for the each of the first plurality of languages, determine third classification output data by processing the input text data using the trained multi-language classifier.

2. The system of claim 1, the hardware processor to further execute the first computer-executable instructions to:

determine a first sample in the first plurality of samples comprises first data expressed in a first language and no data in a second language;

translate the first data to determine second data expressed in the second language; and store the second data as a portion of the first sample.

3. The system of claim 1, the hardware processor to further execute the first computer-executable instructions to:

generate a second plurality of samples in the first plurality of languages and having associated second class labels; and wherein the first training data further comprises:

the first plurality of samples and associated first class labels, and the second plurality of samples and the associated second class labels.

4. The system of claim 1, the hardware processor to further execute the first computer-executable instructions to:

determine an entropy value associated with a sample of the first set of unlabeled training data; and wherein the first set of values comprise the entropy value.

5. A system comprising:

a memory, storing first computer-executable instructions; and a hardware processor to execute the first computer-executable instructions to:

determine a first set of classes;

determine a first plurality of samples, each sample comprising:

language data comprising information expressed in a respective language of a first plurality of languages, and a first class label that is indicative of a respective class of the first set of classes;

determine first classification output data based on processing the first plurality of samples using a first classifier, wherein the first classification output data comprises:

a first plurality of predicted class labels, wherein each class label is indicative of a class of the first set of classes that is associated with a respective sample of the first plurality of samples;

determine, based on the first classification output data, language weight data indicative of respective weight values associated with respective ones of the first plurality of languages;

determine a first set of values, wherein each value is indicative of one or more characteristics of a sample of a first set of unlabeled training data;

determine a first set of ranked unlabeled training data, wherein each sample of the first set of ranked unlabeled training data is ordered based on a respective value of the first set of values;

determine, based on the first set of ranked unlabeled training data, a first set of selected unlabeled training data;

determine, based on the first set of selected unlabeled training data, selected labeled training data comprising one or more samples and an associated label;

train a multi-language classifier using the selected labeled training data;

determine second classification output data;

determine, based on the second classification output data, first accuracy data indicative of an accuracy of the second classification output data;

determine that the first accuracy data does not meet a target accuracy for one or more of the first plurality of languages; and reiterate training of the multi-language classifier using additional labeled training data until the target accuracy for each of the first plurality of languages is met.

6. The system of claim 5, the hardware processor to further execute the first computer-executable instructions to:

determine, based on the first classification output data, second accuracy data indicative of an accuracy of the first classification output data;

determine, based on the second accuracy data and target accuracy data, performance gap data indicative of a variance between the accuracy of the first classification output data and the target accuracy data for one or more of the first plurality of languages; and determine, based on the performance gap data, the language weight data.

7. The system of claim 5, the hardware processor to further execute the first computer-executable instructions to:

determine a total number of samples for use during subsequent training; and determine a number of samples for each language of the first plurality of languages based on a product of the total number of samples and a weight value associated with the respective language.

8. The system of claim 5, the hardware processor to further execute the first computer-executable instructions to:

determine an entropy value associated with a sample of the first set of unlabeled training data;

determine a respective weight value associated with the respective one of the first plurality of languages that is associated with the sample of the first set of unlabeled training data; and wherein the first set of values are based on the entropy value and the respective weight value associated with the sample of the first set of unlabeled training data.

9. The system of claim 5, the hardware processor to further execute the first computer-executable instructions to:

determine a first sample in the first plurality of samples comprises first data expressed in a first language and no data in a second language;

translate the first data to determine second data expressed in the second language; and store the second data as a portion of the first sample.

10. The system of claim 5, the hardware processor to further execute the first computer-executable instructions to:

generate a second plurality of samples, each sample comprising one or more of:

machine-generated language data comprising information expressed in a respective language of the first plurality of languages, or a machine-generated class label that is indicative of a respective class of the first set of classes; and wherein the first plurality of samples comprises:

the second plurality of samples.

11. The system of claim 5, the hardware processor to further execute the first computer-executable instructions to:

determine an entropy value associated with a sample of the first set of unlabeled training data; and wherein the first set of values comprise the entropy value.

12. A computer-implemented method comprising:

a first plurality of samples, each sample comprising:

language data comprising information expressed in a respective language of a first plurality of languages, and a first class label that is indicative of a respective class of a first set of classes;

determining first classification output data based on processing the first plurality of samples using a first classifier, wherein the first classification output data comprises:

a first plurality of predicted class labels, wherein each class label is indicative of a class of the first set of classes that is associated with a respective sample of the first plurality of samples;

determining, based on the first classification output data, language weight data indicative of respective weight values associated with respective ones of the first plurality of languages;

determining a first set of values, wherein each value is indicative of one or more characteristics of a sample of a first set of unlabeled training data;

determining a first set of ranked unlabeled training data, wherein each sample of the first set of ranked unlabeled training data is ordered based on a respective value of the first set of values;

determining, based on the first set of ranked unlabeled training data, a first set of selected unlabeled training data;

determining, based on the first set of selected unlabeled training data, selected labeled training data comprising one or more samples and an associated label;

training a multi-language classifier using the selected labeled training data;

determining second classification output data;

determining, based on the second classification output data, first accuracy data indicative of an accuracy of the second classification output data;

determining that the first accuracy data does not meet a target accuracy for one or more of the first plurality of languages; and reiterating training of the multi-language classifier using additional labeled training data until the target accuracy for each of the first plurality of languages is met.

13. The method of claim 12, further comprising:

determining, based on the first classification output data, second accuracy data indicative of an accuracy of the first classification output data;

determining, based on the second accuracy data and target accuracy data, performance gap data indicative of a variance between the accuracy of the first classification output data and the target accuracy data for one or more of the first plurality of languages; and determining, based on the performance gap data, the language weight data.

14. The method of claim 12, further comprising:

determining a total number of samples for use during subsequent training; and determining a number of samples for each language of the first plurality of languages based on a product of the total number of samples and a weight value associated with the respective language.

15. The method of claim 12, further comprising:

determining an entropy value associated with a sample of the first set of unlabeled training data;

determining a respective weight value associated with the respective language of the first plurality of languages that is associated with the sample of the first set of unlabeled training data; and wherein the first set of values are based on the entropy value and the respective weight value associated with the sample of the first set of unlabeled training data.

16. The method of claim 12, further comprising:

determining a first sample in the first plurality of samples comprises first data expressed in a first language and no data in a second language;

translating the first data to determine second data expressed in the second language; and storing the second data as a portion of the first sample.

17. The method of claim 12, further comprising:

generating a second plurality of samples, each sample comprising one or more of:

machine-generated language data comprising information expressed in a respective language of the first plurality of languages, or a machine-generated class label that is indicative of a respective class of the first set of classes; and wherein the first plurality of samples comprises:

the second plurality of samples.

18. The method of claim 12, further comprising:

determining an entropy value associated with a sample of the first set of unlabeled training data; and wherein the first set of values comprise the entropy value.

19. The system of claim 5, the hardware processor to further execute the first computer-executable instructions to:

determine input text data in one of the first plurality of languages; and after the target accuracy has been met for the each of the first plurality of languages, determine third classification output data by processing the input text data using the trained multi-language classifier.

20. The method of claim 12, further comprising:

determining input text data in one of the first plurality of languages; and after the target accuracy has been met for the each of the first plurality of languages, determining third classification output data by processing the input text data using the trained multi-language classifier.

\* \* \* \* \*